United States Patent
Jonnalagadda

(10) Patent No.: US 7,787,499 B2
(45) Date of Patent: Aug. 31, 2010

(54) MAINTAINING SYNCHRONIZATION OF MULTIPLE DATA CHANNELS WITH A COMMON CLOCK SIGNAL

(75) Inventor: Sridhar Jonnalagadda, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 1292 days.

(21) Appl. No.: 11/303,409

(22) Filed: Dec. 16, 2005

(65) Prior Publication Data

US 2006/0092984 A1    May 4, 2006

Related U.S. Application Data

(62) Division of application No. 10/329,378, filed on Dec. 27, 2002, now Pat. No. 7,200,767.

(51) Int. Cl.
*H04J 3/06* (2006.01)
(52) U.S. Cl. .................................................. 370/509
(58) Field of Classification Search .............. 370/509, 370/510, 512, 514, 520, 522, 907, 324, 350, 370/349, 328, 282, 278, 292, 302; 713/400, 713/500, 501, 600
See application file for complete search history.

(56) References Cited

U.S. PATENT DOCUMENTS

| | | | | |
|---|---|---|---|---|
| 6,658,582 B1 * | 12/2003 | Han | ............................ | 713/500 |
| 7,085,950 B2 * | 8/2006 | Ehmann et al. | .............. | 713/503 |
| 7,328,360 B2 * | 2/2008 | Jonnalagadda | .............. | 713/400 |

* cited by examiner

*Primary Examiner*—Chi H Pham
*Assistant Examiner*—Alexander Boakye
(74) *Attorney, Agent, or Firm*—Robert D. Marshall, Jr.; W. James Brady; Frederick J. Telecky, Jr.

(57) ABSTRACT

Maintaining synchronization when sending/receiving multiple channels of data with a corresponding common reference clock signal. Synchronization signals (e.g., pulses) are generated periodically and the timing of channels is adjusted. In an embodiment, multiple sequences of parallel data elements are received on corresponding parallel data channels using a first common clock signal. Each sequence of parallel data elements is converted to a corresponding sequence of serial data elements. The serial data elements are transmitted on a corresponding serial channel using a serial clock as a common reference. A synchronization signal may be generated periodically with a time period of (the number of bits in each parallel data element x the time period of the serial clock), wherein 'x' represents multiplication operation. As the parallel data channels are synchronized in short intervals, synchronization is maintained.

19 Claims, 10 Drawing Sheets

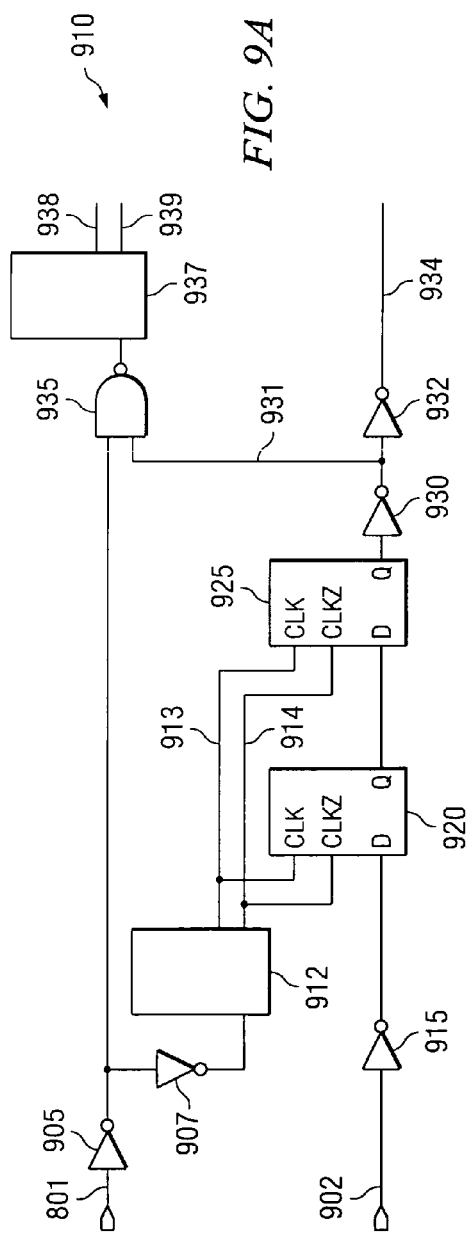
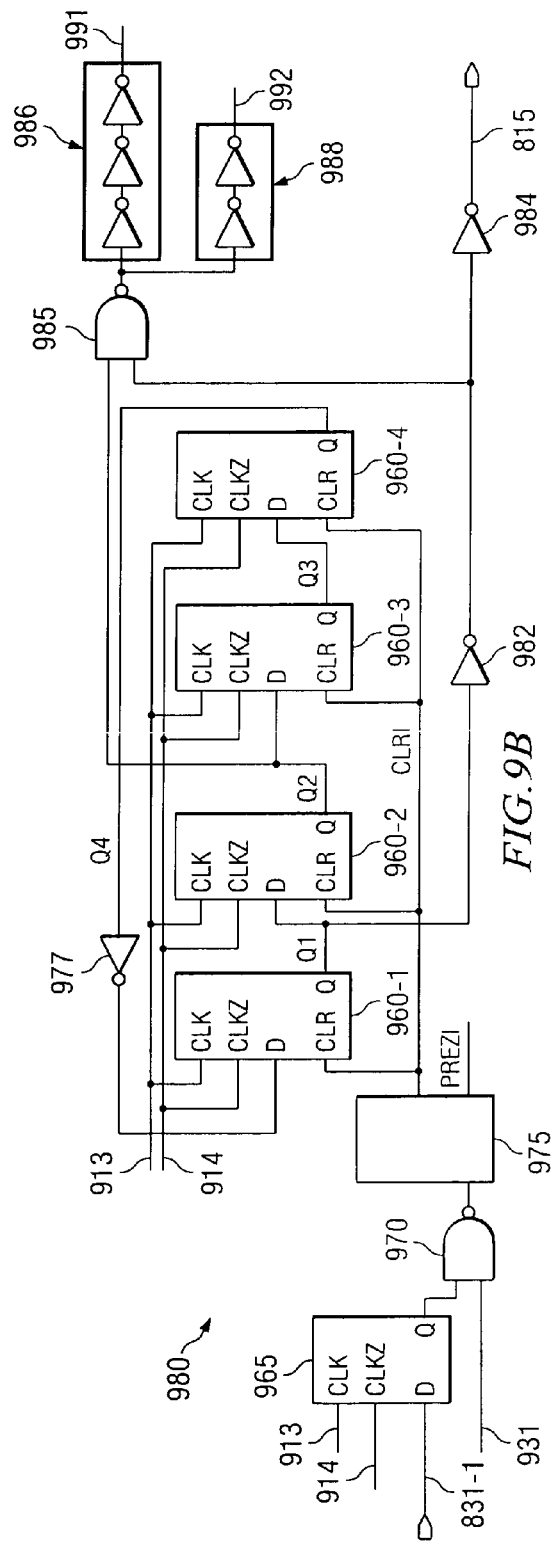
FIG. 9A
FIG. 9B

MAINTAINING SYNCHRONIZATION OF MULTIPLE DATA CHANNELS WITH A COMMON CLOCK SIGNAL

This application is a divisional of U.S. patent application Ser. No. 10/329,378 filed Dec. 27, 2002, now U.S. Pat. No. 7,200,767.

BACKGROUND OF THE INVENTION

1. Field of the Invention

The present invention relates to communication systems, and more specifically to a method and apparatus for maintaining synchronization of multiple data channels to a common clock signal over time.

2. Related Art

Channels are often provided using various types (e.g., wire-based, wire-less, etc.) of paths, and are used to transfer data. A clock signal often provides a time reference for the data transfers such that the data can be recovered at the receiving end using the time reference.

Data is often received on one channel ("receive channel") and transmitted on another channel ("transmit channel"). Data streams are often received on corresponding receive channels, and each data stream is transmitted on a corresponding transmit channel.

It is often desirable to synchronize multiple data channels to a common time reference. Such a synchronization may enable, for example, a common clock signal to be used supporting the transfer of data on all the data channels. By using a single reference signal, several advantages such as minimizing a number of pins, minimizing electrical power consumption, etc., can be obtained, as is well known in the relevant arts.

One problem often encountered is that data channels may go out-of-synchronization over a long period of operation (e.g., due to alpha particles hits, power supply glitches, or drift), even if the channels are synchronized at some point of time. The absence of synchronization may lead to errors in transmission and/or reception of bits as is well known in the relevant arts, and is therefore undesirable. Accordingly, at least for such reasons, it may be desirable to continue to maintain synchronization of the data channels such that the data may be reliably sent and/or received.

SUMMARY OF THE INVENTION

According to an aspect of the present invention, synchronization signals (e.g., pulses) are generated with a short interval, and the generated synchronization signals are used to re-synchronize any parallel data channels, which are out-of-synchronization ("out-of-sync"), to a common time reference. By re-synchronizing the out-of-sync at short intervals to the common time reference, synchronization may be continued to be maintained over a long period of time. Such continued synchronization may enable a common clock signal to be used as a reference signal associated with all the parallel data channels. Using a common clock signal may result in several advantages such as reduction of electrical power consumption.

In an embodiment, a transmitter block contains a synchronization generator and multiple converter blocks. The synchronization generator generates a sequence of synchronization signals with a short interval. Each converter block receives a sequence of parallel data elements (e.g., bytes) on a corresponding parallel data channel using a first common clock signal, and converts the parallel data elements to a corresponding sequence of serial data elements (bits). The converter block sends the sequence of serial data elements on a corresponding serial data channel.

The converter blocks receive the synchronization signals and ensure that all the parallel data channels are synchronized to a common time reference in response to a synchronization signal. In an implementation, each parallel data contains a byte (8 bits) and the synchronization signals are generated periodically with a time period of eight times the time period of a second clock signal used as a common clock reference for the serial data channels.

An embodiment of the transmitter block is used to implement an OC-192 (10 GBPS) node. The embodiment may contain 16 converter blocks, with each converter block operating at 622.08 Mbps.

Each converter block may contain a shift register converting each parallel data element into serial data elements, with the shift register loading each parallel data element at a time point specified in relation to a synchronization signal. The shift register shifts a loaded parallel data element to generate corresponding serial data elements. In an embodiment, the converter block contains a sync counter generating a select signal synchronized with the synchronization signals, wherein the select signal specifies the time point to load each of the parallel data elements in the shift register. The sync counter may further generate the first common clock signal synchronized with the synchronization signals.

The transmitter block may further contain a PLL (phase lock loop) generating a PLL clock signal, and a signaling circuit passing the PLL clock signal as the second common clock signal when a reset signal is not received. The signaling circuit venerates the second common clock signal and a complement of the second common clock signal, which are out-of-phase by 180 degrees, wherein the shift register is coupled to receive the second common clock signal and the complement of the second common clock signal. The signaling circuit further synchronizes the reset signal to the PLL clock signal to generate a clear signal, wherein the clear signal causes the shift register to be cleared to all zeros state.

A receiver block may also be implemented using several of the approaches noted above. The receiver block receives serial data channels and sends the data in corresponding parallel data channels. Synchronization signals may be used to synchronize the parallel data channels to a common time reference, and a common clock may be used to support all the parallel data channels. Such use of a common clock signal again leads to several advantages such as reduction of power consumption requirements. Embodiments of the transmitter block and receiver block may be implemented, either individually or in combination, in several environments such as SONET networks.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

An aspect of the present invention generates synchronization (sync) signals which are used to synchronize multiple parallel data channels to a common time reference. The sync signals may be generated periodically at short intervals and any parallel data channels which are out-of-synchronization may be re-synchronized upon receiving a sync signal. By maintaining synchronization, a common clock signal may be used associated with all the parallel data channels.

Several aspects of the invention are described below with reference to examples for illustration. It should be understood that numerous specific details, relationships, and methods are set forth to provide a full understanding of the invention. One skilled in the relevant art, however will readily recognize that the invention can be practiced without one or more of the specific details, or with other methods, etc. in other instances, well-known structures or operations are not shown in detail to avoid obscuring the invention.

2. Example Device

Figure 1:
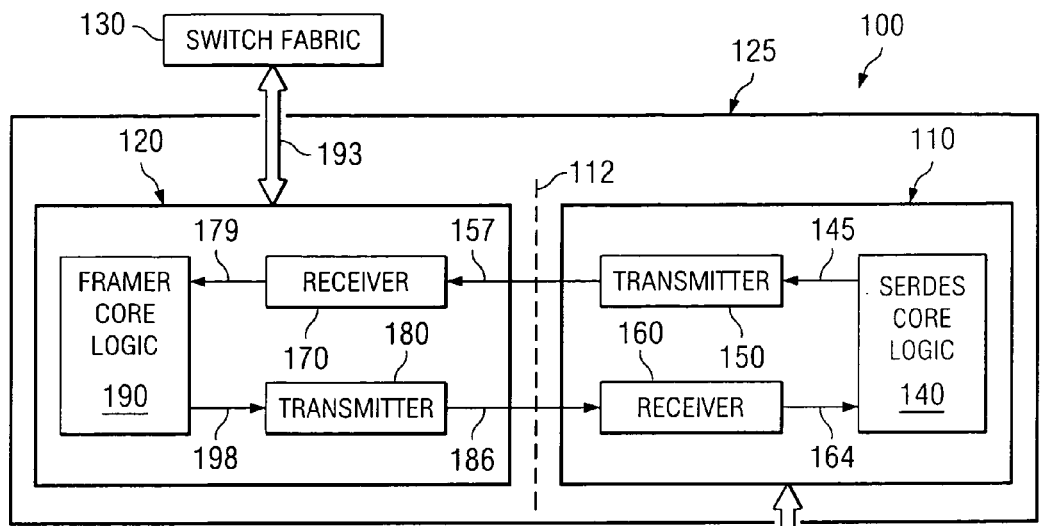
FIG. 1 is a block diagram of an example system in which the present invention may be implemented.

FIG. 1 is a block diagram containing device 100 receiving and transmitting data on SONET network 135. Device 100 is shown containing line card 125 and switch fabric 130. Line card 125 receives high speed data (e.g., at 10 GBPS) on path 101. Switch fabric 130 receives the data from line card 125 and forwards the data in the form of frames to the corresponding end systems (not shown). Similarly, device 100 receives frames from the end systems and sends the corresponding data on path 101, for eventual transmission on network 135.

Line card 125 is shown containing SERDES (serializer-deserializer) 10 and framer 120. For illustration, it is assumed that the interface between SERDES 110 and framer is implemented to support SFI-4 112 (SERDES Framer Interface-4) standard defined by Optical Internetworking Forum (OIF). However, device 100 can be implemented with other standards and other environments as well. SFI-4 standard is described in further detail in a document entitled, "OIF-SFI4-01.0—Proposal for a common electrical interface between SONET Framer and serializer/deserializer parts for OC-192 interfaces", available from http://www.oiforum.com/, and is incorporated in its entirety into the present application. Each component is described below first with respect to receiving data from network 135 and then with respect to transmission.

Continuing with respect to reception of data from network 135, SERDES 110 receives serial data on path 101 and may provide the same data using multiple (more) serial data channels on path 157 to framer 120. By using more channels, the data may be provided using a slower clock signal compared to a clock signal used to receive data on path 101. In an embodiment, SERDES 110 may provide the data received (using potentially 4 channels) on path 101 over 16 data channels on path 157. Thus. SERDES 110 converts the high speed data received on path 101 into lower speed data by using more channels on path 157.

Framer 120 may convert the data received in each channel to corresponding frames (e.g., IP packets), and the frames are forwarded to switch fabric 130 on path 193. The conversion may be performed in a known way.

Similarly, with respect to transmission of data to network 135, framer 120 receives frames on path 193, and converts the frames into a form suitable for transmission on network 135. The converted data for each frame is assigned to a corresponding serial data channel, for example, based on user configuration. The resulting multiple (16 in the illustrative example) serial data channels are provided on path 186.

SERDES 110 may receive the data corresponding to 16 channels on path 186 and provide high speed data on path 101. SERDES 110 is shown containing SERDES core logic 140, transmitter 150 and receiver 160. Each component is described below.

SERDES core logic 140 may receive high speed serial data on path 101 and convert the high speed serial data into low speed parallel data on path 145. In the illustrative example of optical carrier-192 (OC-192) having a throughput of 10 Gbps. SERDES core logic 140 may receive 3.125 Gbps serial data on four channels over path 101. The same data is converted into 16 channels, with each channel containing parallel data of eight bits each. Such conversion from serial to parallel data for each channel may be performed in a known way.

Thus, SERDES core logic 140 may provide 128 bits of data to transmitter 150 during each clock cycle (assuming 8 parallel bits of data are presented for each of the 16 channels). Accordingly, transmitter 150 may receive data bytes using a clock signal with a lower frequency compared to the frequency at which bits are received on path 101. Similarly, SERDES core logic 140 may also receive low speed parallel data on path 164 and may convert the parallel data into higher speed serial data on path 101.

Transmitter 150 may receive the low speed parallel data on path 145 for each parallel data channel and provide the corresponding higher speed serial data channel on path 157. In the illustrative example, transmitter 150 may use 16 serial data channels on path 157 to support the corresponding 16 parallel data channels. Each of the 16 serial data channels may operate at a clock frequency of 622 Mbps. As described in sections below, a common clock signal may be used associated with all the 16 parallel data channels, another common clock signal may be used associated with all the 16 serial data channels.

Receiver 160 receives data on multiple serial data channels on path 186 using a common clock signal. The data corresponding to each serial data channel may be converted into parallel data (e.g., bytes) and provided on path 164 using a slower clock signal compared to the common clock signal received on path 186. In the illustrative example, path 164 may contain 128 bits (in addition to other paths for purposes such as clocking) corresponding to a byte of parallel data for each of the 16 channels.

Framer 120 is shown containing receiver 170, transmitter 180 and framer core logic 190. Each component is described below.

Receiver 170 may receive high speed serial data for each of multiple channels on path 157 and provide a lower speed parallel data for each of the channels on path 179. Similarly, transmitter 180 may receive a low speed parallel data on path 198 and transmit a higher speed serial data on path 186. In an embodiment, receiver 160 and transmitter 150 are respectively implemented similar to receiver 170 and transmitter 180. However, as embodiments of receiver 170 and transmitter 180 can be implemented to conform with OIF standards while implementing various features of the present invention, alternative embodiments of receiver 160 and transmitter 150 may be implemented in a known way consistent with OIF format.

Framer core logic 190 may receive parallel data corresponding to multiple data channels on path 179 and convert the parallel data into corresponding frames. The frames are provided to switch fabric 130 on path 193. Similarly, framer core logic 190 may receive frames on path 193, and converts the frames into parallel data corresponding to multiple data channels on path 198.

As noted above, transmitter 150 receives the parallel data corresponding to multiple channels on path 145 and converts the parallel data of each channel into a serial data of corresponding channel along with a common clock signal. Receiver 170 receives the serial data corresponding to multiple channels on path 157 and converts the serial data into parallel data corresponding to each channel. Transmitter 150 and receiver 170 respectively transmit and receive multiple serial data channels on path 157. The multiple serial data channels may be implemented as synchronous channels sharing the same clock signal as a reference signal.

In general, each receiver-transmitter pair operates consistent with SFI-4 standard as noted above. However, various modifications can be made to each of the receivers and transmitters independent of the component on the other side. In particular, aspects of the present invention enables each component to use common clock signals in both reception and transmission of data on the data channels. By using such common clock signals, advantages such as reduction in electrical power consumption can be realized.

To enable the use of a common clock signal, the channels on the corresponding side may need to remain synchronized to a common time reference. The manner in which the present invention enables such synchronization to be maintained is described below with several examples.

3. Method

Figure 2:
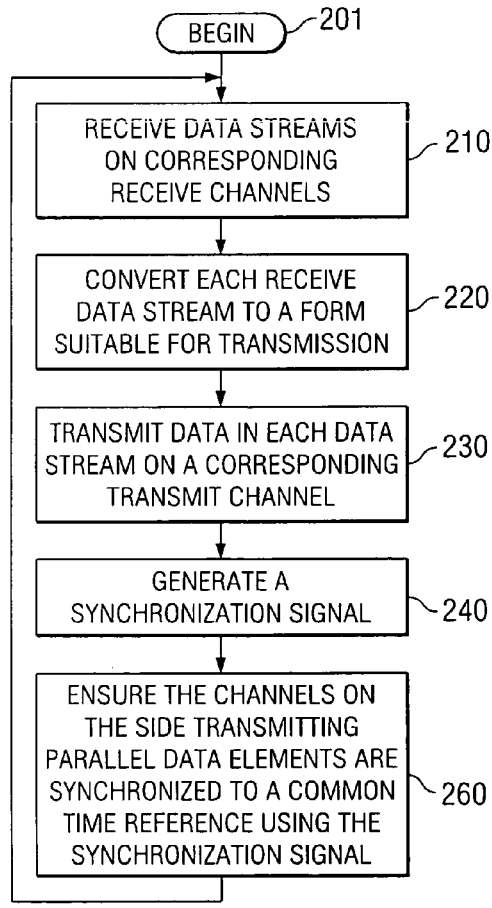
FIG. 2 is a flowchart illustrating the details of a method by which synchronization may be maintained in various data channels according to an aspect of the present invention.

FIG. 2 is a flowchart illustrating the details of a method by which synchronization may be maintained in various data channels according to an aspect of the present invention. The method is described with reference to FIG. 1 for illustration. However, the method can be implemented in other embodiments without departing from the scope and spirit of the present invention, as will be apparent to one skilled in the relevant arts based on the disclosure provided herein. The method begins in step 201 in which control passes to step 210.

In step 210, data streams ("receive data streams".) are received on a corresponding number of receive channels. In step 220, each receive data stream is converted to a corresponding transmit stream in a form suitable for further sending. If a receive data stream contains only bits, the transmit stream is generated to contain multiple parallel data elements. On the other hand, if a receive data stream contains parallel data elements, the transmit data stream is generated to contain data bits (forming serial data elements).

In step 230, each transmit data stream is transmitted on a corresponding one of multiple transmit channels. In step 240, a synchronization (sync) signal is generated. One of several approaches can be used to generate the sync signal. An example approach for generating the sync signal is described in a section below.

In step 260, the synchronization signal is used to ensure that all the channels on a side containing the parallel data elements are synchronized to a common time reference. While the steps are shown in sequence, it should be understood that the steps can be performed in parallel. The steps of FIG. 2 are repeated, with the synchronization signal being generated at short intervals.

As a result, a common clock signal may be used associated with all the parallel data channels. In addition, another common clock signal may be used associated with the serial data channels as well due to the prior synchronization. Several embodiments may be implemented using the approach(es) of FIG. 2. Example embodiments are described first with reference to receiver 170 and then with reference to transmitter 180.

4. Receiver

Figure 3:
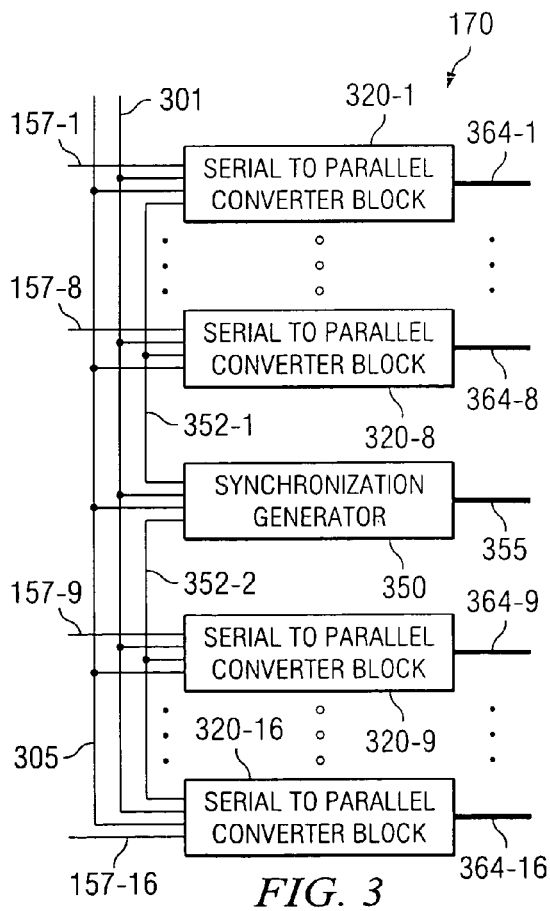
FIG. 3 is a block diagram illustrating the details of a receiver in an embodiment of the present invention.

FIG. 3 is a block diagram illustrating the details of receiver 170 in an embodiment of the present invention. Receiver 170 is shown containing serial to parallel converter blocks 320-1 through 320-16, and sync generator (SYNC8) 350. Each component is described in detail below.

For illustration, receiver 170 is shown receiving 16 independent serial data channels 157-1 through 157-16 (all contained in path 157 of FIG. 1) and common clock signal 301. While the embodiments are described with reference to 16 channels for illustration, alternative embodiments can be implemented with a different number of channels without departing from the scope and spirit of various aspects of the present invention, as will be apparent to one skilled in the relevant arts.

Common clock signal 301 represents the reference clock signal to which the received serial data channels 157-1 through 157-16 are synchronized. Common clock signal 301 may be generated based on a clock signal received from transmitter 150 along with the 16 serial data channels.

Sync generator 350 generates sync signal resynchzinta 352-1 and a similar sync signal resynchzintb 352-2. The resynchzinta and resynchzintb signals may be identical signals and operate in similar manner. By using different identical signals, the capacitive load on sync generator 350 is advantageously distributed among the signals.

The sync signals may be generated only when sync-enable signal 355 is at a logic high. Sync generator 350 also receives CLK signal 301 and RESETZ 305 signals. The RESETZ signal initially resets sync generator 350 to a known state. Common clock signal 301 is used to ensure that resynchzinta 352-1 and resynchzintb 352-2 (resync signals) are consistently generated at a specific phase relationship with clock signal 301.

The resync signals may be generated at a frequency determined by the number of bits in the parallel path of each of the 16 channels. Assuming each parallel path 364-1 through 364-16 contains 8 bits, the resync signals may be generated in the form of pulses every (n×8)—cycles (where 'x' represents multiplication and 'n' is an integer constant) of CLK signal 301.

Serial to parallel converter blocks 320-1 through 320-16 respectively receive the high speed serial data on channels 157-1 through 157-16, and sample the corresponding data bits according to CLK 301 signal. Serial to parallel converter blocks 320-1 through 320-16 respectively convert the high speed serial data into parallel data, which is then provided on paths 364-1 through 364-16.

In addition, each of serial to parallel converter blocks 320-1 through 320-16 may generate clock signals (not shown) to provide time reference to the corresponding parallel data. However, the clock signals may be synchronized to a common time reference using the resync signals. As a result, one of the clock signals may be used as a common clock signal s2pclkout 364-17 associated with all 16 parallel data channels 364-1 through 364-16 (all paths 364-1 through 364-17 being contained in path 179 of FIG. 1). Thus, the parallel data of all 16 channels on paths 364-1 through 364-16 may be provided using s2pclkout 364-17 as a common time reference clock. The RESETZ signal is used to reset all serial to parallel converter blocks 320-1 through 320-16 to a known state.

Serial to parallel converter blocks 320-1 through 320-8 also receive resynchzinta 352-1 and blocks 320-9 through 320-16 receive resynchzintb 352-2. The resynchzinta and resynchzintb signals are used to synchronize the blocks that are out of sync with the common reference clock s2pclkout 364-17. Example embodiments of serial to parallel converter blocks 320-1 through 320-16 are described below with reference to FIG. 4.

5. Serial to Parallel Converter

Figure 4A:
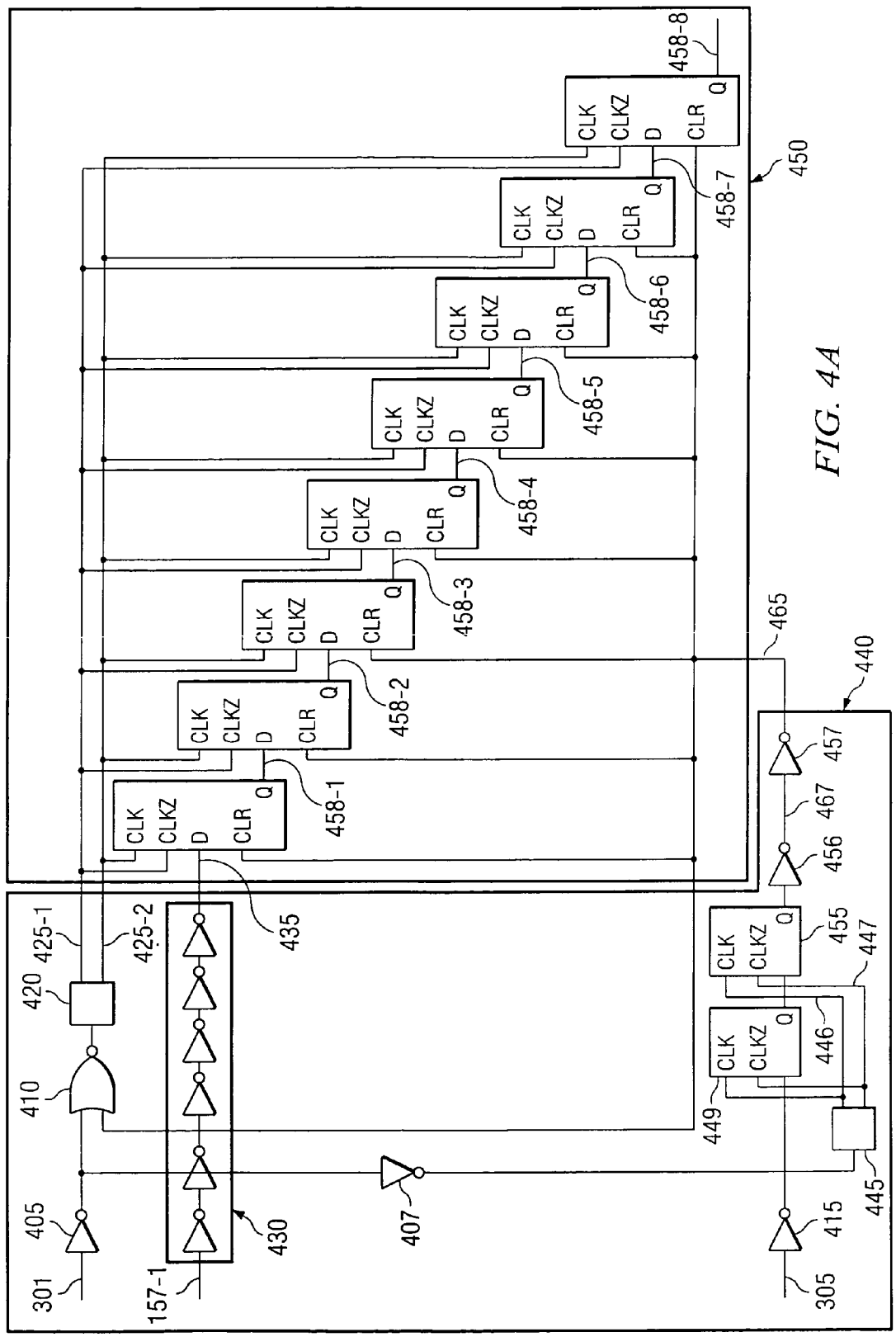
FIGS. 4A through 4C together depict a circuit diagram illustrating the details of a serial to parallel converter in an embodiment of the present invention.
Figure 4B:
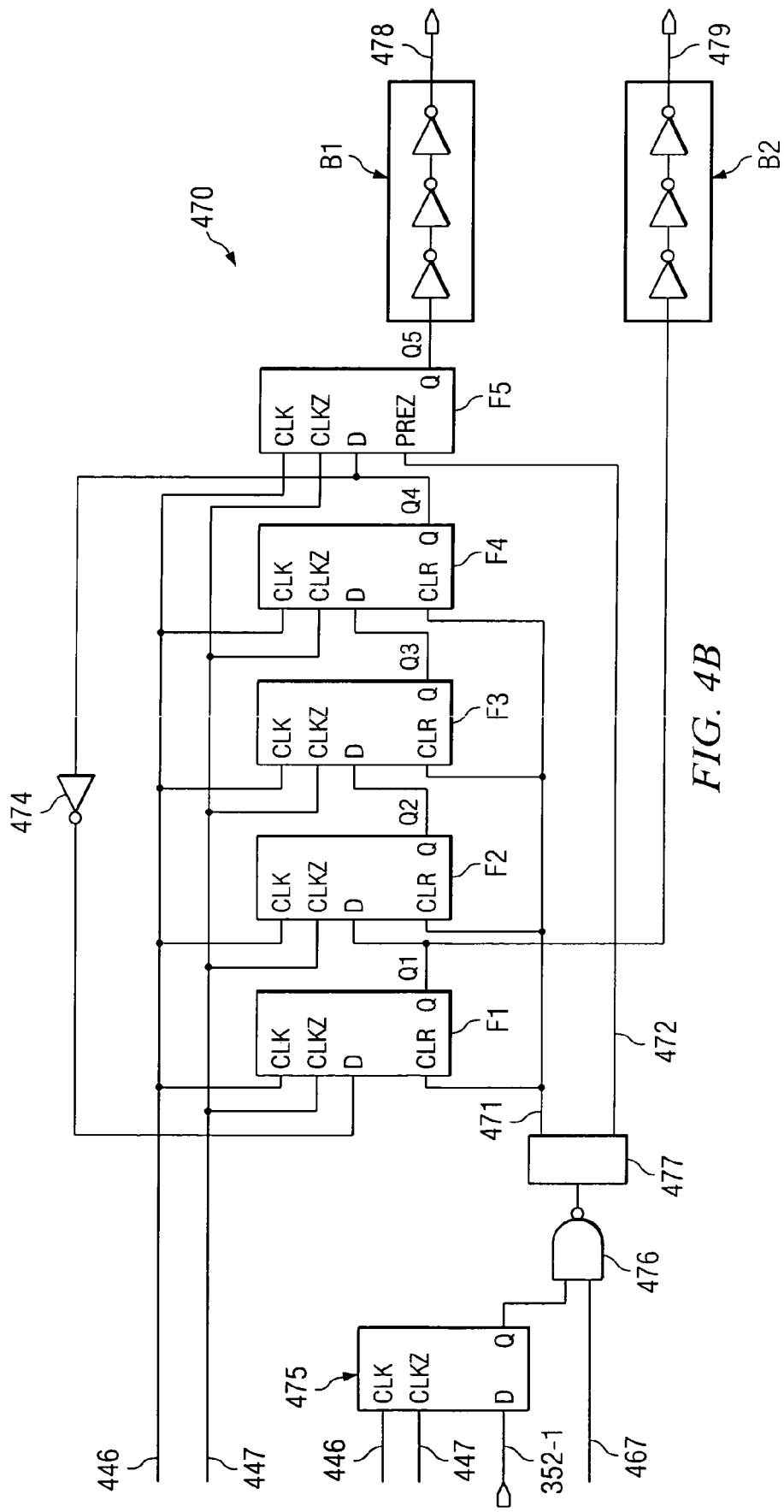
Figure 4C:
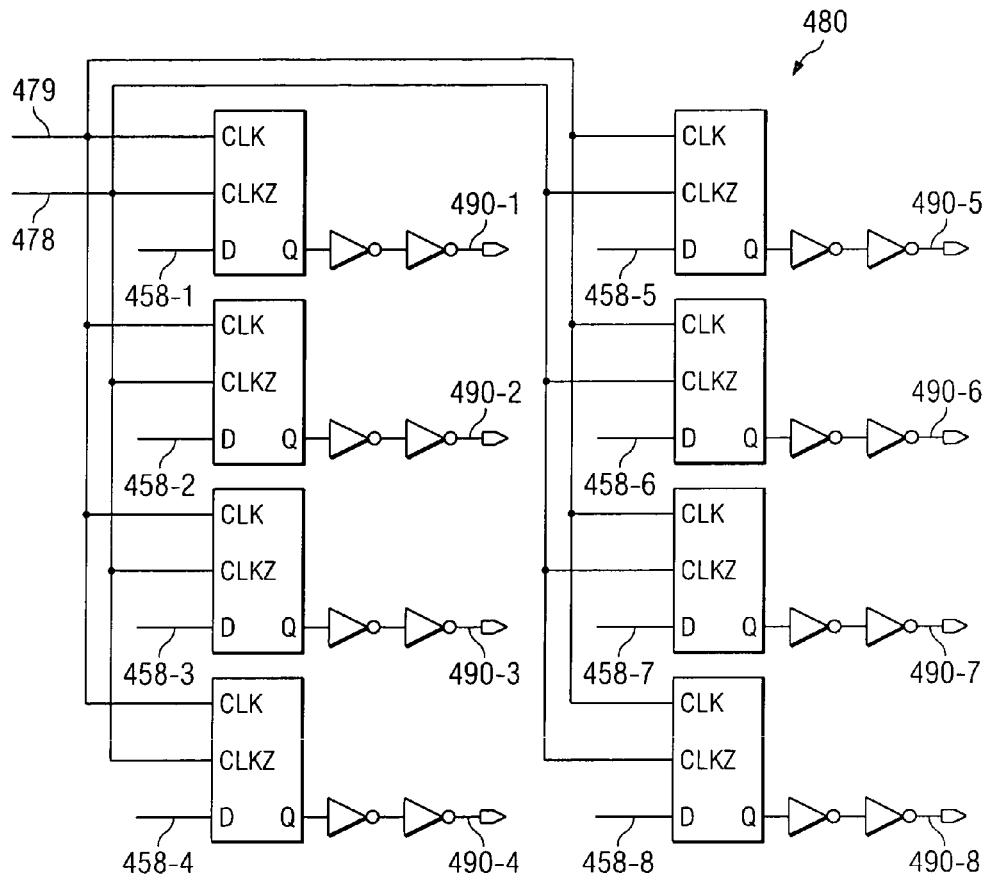

FIGS. 4A, 4B and 4C together represent a circuit diagram illustrating the details of serial to parallel converter 320-1 in an embodiment of the present invention. However, the remaining serial to parallel converter blocks 320-2 through 320-16 may also be implemented in a similar manner. Serial to parallel converter 320-1 is shown containing signaling circuit 440, serial shift register 450, sync counter 470, and parallel shift register 480. Each component is described below.

Serial to parallel converter 320-1 converts high speed serial data received on path 157-1 into 8-bit parallel data on paths 490-1 through 490-8 (part of path 364-1 of FIG. 3). For illustration, serial to parallel converter 320-1 is implemented to provide 8-bit parallel data. However, alternative embodiments may be implemented with different number of bits in parallel without departing from the scope and spirit of the present invention, as will be apparent to one skilled in the relevant arts based on the disclosure provided herein.

Continuing with exclusive reference to FIG. 4A, signaling circuit 440 is shown containing inverters 405, 407, 415, 456 and 457. NOR gate 410, complementary signal generators 420 and 445, buffer 430, and flip-flops 449 and 455. The components operate to generate BUFCLK 425-1, BUFCLKZ 425-2, BUFDIN 435, INTRESET 465 (internal reset). The components and output signals are described below in further detail.

Inverter 405 and NOR gate 410 operate to pass CLK signal 301 when INTRESET 465 is at a low logical level. When INTRESET 465 is high, CLK signal 301 is not passed through. Complementary signal generator 420 receives (the double inverted) CLK signal 301 and generates BUFCLK 425-1 and BUFCLKZ 425-2 signals. The BUFCLK 425-1 and BUFCLKZ 425-2 signals are complement to each other (i.e., 180 degrees out of phase), but with transitions occurring at the same time points. It may thus be appreciated that inverter 405, NOR gate 410 and complementary signal generator 420 together provide a delayed version of CLK signal 301 to serial shift register 450.

Buffer 430 receives serial data on path 157-1 and provides the delayed data BUFDIN 435. Butter 430 is shown containing six inverters connected in series and thus the output of buffer 430 is same as the input signal except with certain delay. Buffer 430 may be designed to provide the same amount of delay as components 405, 410 and 420 in order to provide the received serial data on path 157-1 at the same time as CLK signal 301 to serial shift register 450.

Inverters 407, 415, and 456, complementary signal generator 445, and flip-flops 449 and 455 operate to generate INTRESETZ 467, which represents RESETZ signal 305 synchronized with CLK signal 301 to avoid meta-stability. To achieve such a result, inverter 407 inverts the inverted CLK signal (generated by inverter 405) and provides the delayed CLK signal to complementary signal generator 445. Complementary signal generator 445 generates the complementary clock signals clkin 446 and clkinz 447, which are respectively connected to clk and clkz inputs of flip-flops 449 and 455.

Flip-flop 449 receives the inverted RESETZ signal from inverter 415 and clock signals (clkin and clkinz) derived from CLK 301, and provides the inverted and synchronized RESETZ signal to flip-flop 455. Flip-flop 455 again synchronizes the inverted RESETZ signal with the clock signals (clkin and clkinz) and provides the synchronized RESETZ signal to inverter 456.

Inverter 456 inverts the inverted and synchronized RESETZ signal and provides the synchronized RESETZ signal as INTRESETZ 467. INTRESETZ signal 467 is inverted by inverter 457 and provided as INTRESET 465. Thus, signaling circuit 440 provides CLK 301, RESETZ 305 and serial data 157-1 respectively to serial shift register 450 as BUFCLK 425-1, INTRESET 465 and BUFDIN 435 with a desired timing relationship.

Serial shift register 450 receives BUFCLK (clock generated by complementary signal generator) 425-1, BUFCLKZ (inverted version of BUFCLK) 425-2, BUFDIN 435, INTRESET (internal reset) 465. Serial shift register 450 may be implemented to operate at high frequency of the clock signals BUFCLK and BUFCLKZ.

Serial shift register 450 is shown containing eight flip-flops connected in series. Each flip-flop contains two clock inputs, D-input, CLR input and Q-output. Each flip-flop may be implemented in master-slave configuration, which needs complementary clock signals. Thus, two complementary clock signals BUFCLK 425-1 and BUFCLKZ 425-2 (generated by complementary signal generator 420) are provided to reduce set up time of the flip-flop. The two clock inputs of each flip-flop are respectively connected to clock signals BUFCLK 425-1 and BUFCLKZ 425-2.

The D-input of the first flip-flop is connected to BUFDIN 435 and the D-input of remaining flip-flops are connected to Q-output of the previous flip-flop. The CLR input of all flip-flops is connected to INTRESET 465.

In operation, all flip-flops may initially be reset to logic low by asserting INTRESET 465 signal. After resetting all the flip-flops, eight successive bits of the serial data received on BUFDIN 435 are stored in the eight flip-flops by the shift operations. The stored 8-bits are provided on paths 458-1 through 458-8.

Continuing with reference to FIG. 4B, sync counter 470 generates divby8 478 and divby8z 479 clock signals, which represent CLK 301 divided by 8, but re-synchronized with resynchzinta 352-1. Divby8 478 clock signal may represent the common time reference clock signal s2pclkout 364-17 (of FIG. 3) to provide parallel data on paths 490-1 through 490-8.

The two clock signals divbys and divby8z are complements of each other. Sync counter 470 is shown containing flip-flop 475, NAND gate 476, complementary signal generator 477, five flip-flops F1, F2, F3, F4 and F5, inverter 474 and buffers B1 and B2. The operation of each component is described below.

Flip-flop 475 synchronizes resynchzinta 352-1 to clkin 446 and clkinz 447, and generates the synchronized signal on the Q-output. As may be appreciated, flip-flop 475 provides a delay to satisfy setup and hold times for resynchzinta signal 352-1 when the signal arrives at the input of flip-flops F1-F5.

NAND gate 476 generates an output of high logical value when either the output of flip-flop 475 (i.e., re-timed resynchzinta 352-1) or INTRESETZ 467 is of a low logical value, and an output of a low logical value otherwise. Complementary signal generator 477 generates clr 471 which equals the output of NAND gate 476. Complementary signal generator 477 further generates prez 472, which represents an inverted version of clr 471 with the same time reference.

Each of the flip-flops F1, F2, F3 and F4 contains inputs clk, clkz, D, clr and output Q. Flip-flop F5 contains inputs clk, clckz, D, prez and output Q. The inputs clk and clkz of all flip-flops are respectively connected to clkin 446 and clkinz 447 signals. The clr input of flip-flops F1, F2, F3 and F4 is connected to clr signal 471 and prez input of flip-flop F5 is connected to prez signal 472. The output of each flip-flop is connected to D-input of the next flip-flop except that the D-input of flip-flop F1. The D-input of flip-flop F1 is connected to inverted Q-output of flip-flop F4 through inverter 474.

Flip-flops F1, F2, F3, F4 and F5 and inverter 474 form a Johnson counter with 8-states repeating for every eight clock cycles. A logical low value of resynchzinta 352-1 causes clr 471 and prez 472 signals to be high and low respectively, which clears Q-outputs (makes logic low) of flip-flops F1, F2, F3 and F4 and sets (makes logic high) flip-flop F5. The Q-output of flip-flops F1, F2, F3, F4 and F5 are respectively represented as Q1, Q2, Q3, Q4 and Q5. By denoting an output state in which (Q1 Q2 Q3 Q4 Q5=0 0 0 0 1) as state A, the Johnson counter attains state A once in every 8-clock cycles.

Buffer B1 inverts Q5 to generate divby8 signal 478. As Q5 stays high for four consecutive clock cycles and low for four consecutive clock cycles, divby8 signal 478 operates with a period of eight cycles of CLK signal 301. Buffer B1 may be implemented using inverters connected in sequence, as shown. Buffer B2 receives the output of flip-flop F1 (Q1) and is shown implemented with three inverters (similar to butter B1) connected in series. Thus, buffer B2 inverts Q1 and provides the output divby8z signal 479. As the output Q1 goes low once in every $8^{th}$ clock cycle, divby8z signal 479 goes high once in every $8^{th}$ cycle, and thus operates as a complement of divby8 signal 478.

Due to reasons such as alpha particle hits or power supply glitches and drifts, divby8 signal 478 of one or a few of the 16 serial-to-parallel converter blocks 320-1 through 320-16 may not go low exactly once every $8^{th}$ clock cycle of clkin signal 446. The manner in which such out-of-synchronization signals may be re-timed to attain synchronization is described again with reference to block 320-1 below.

It may be first appreciated that resynchzinta 352-1 goes low once in every $8^{uh}$ (corresponding to 8-bits of parallel data on path 364-1) clock cycle (of CLK 301) causing clr 471 and prez 472 to go high. The high state in turn causes the Johnson counter of flip-flops F1, F2, F3, F4 and F5 to change to state A (convention noted in the paragraphs above). Therefore, resynchzinta signal 352-1 causes the Johnson counter to change to state A, which causes the output Q5 to go high and accordingly the divby8 signal 478 goes low. For example, if resynchzinta 352-1 goes low at clock cycles denoted by p, p+8, p+16, etc., then all the channels operate synchronized starting from clock cycles denoted by p+1, (p+8)+1, (p+16)+1, respectively. Thus, the sync signal (resynchzinta 352-1) may cause the out-of-sync channel to be in sync without much latency.

However, resynchzinta signal 352-1 may not affect channels already in sync. If serial to parallel converter 320-1 is already in sync, sync counter 470 may already reach state A independently when clr 471 is asserted. Thus, a channel which is already in sync may operate without being affected even if resynchzinta signal 352-1 is applied.

The sync signal to all sync counters in serial to parallel converter blocks 320-1 through 320-16 may be received substantially at the same time and thus all channels which are out of sync may be synchronized without much latency. The manner in which the divby8 signal of channel 1 and channel 2 changes with resynchzinta signal is illustrated in sections below with reference to FIGS. 5A to 5C.

Now continuing with reference to FIG. 4C, parallel shift register 480 receives Divby8 478, divby8z 479 signals and 8-bit serial data stored in serial shift register 450 on paths 458-1 through 458-8. Parallel shift register 480 converts the received high speed serial data into low speed parallel data, and provides the converted data bits on paths 490-1 through 490-8 (forming path 364-1 of FIG. 3).

Parallel shift register 480 is shown containing eight flip-flops, with each flip-flop containing clk, clkz and D-inputs, and Q-output. The clk and clkz inputs are respectively connected to divby8z 479 and divby8 478 signals and D-inputs of eight flip-flops are respectively provided with a bit of 8-bit serial data on paths 458-1 through 458-8 (generated in FIG. 4A). The Q-output of each flip-flop is connected to a corresponding buffer formed by two inverters connected in series. The output of each buffer is provided on a corresponding one of paths 490-1 through 490-8.

Parallel shift register 480 provides the parallel data on paths 490-1 through 490-8 whenever it receives divby8 and divby8z clock signal. The divby8z signal goes high and divby8 goes low once every $8^{th}$ cycle of CLK signal 301 as described above. Thus, 8-bits of high speed serial data 157-1 are shifted into serial shift register 450 using high speed clock CLK 301. Parallel shift register 480 provides the 8-bit parallel data on paths 490-1 through 490-8 using low speed clock divby8 478.

The divby8 and divby8z signals in serial to parallel converter blocks 320-1 through 320-16 may be generated synchronous with the sync signals (resynchzinta or resynchzintb). However, the divby8 signal corresponding to only one of the blocks 320-1 through 320-16 may be provided as s2pclkout on path 364-17 to SERDES core logic 140. The manner in which the divby8 signal may be re-timed for synchronization with resynchzinta signal is illustrated below with reference to FIGS. 5A to 5C.

6. Divby8 Signal

Figure 5A:
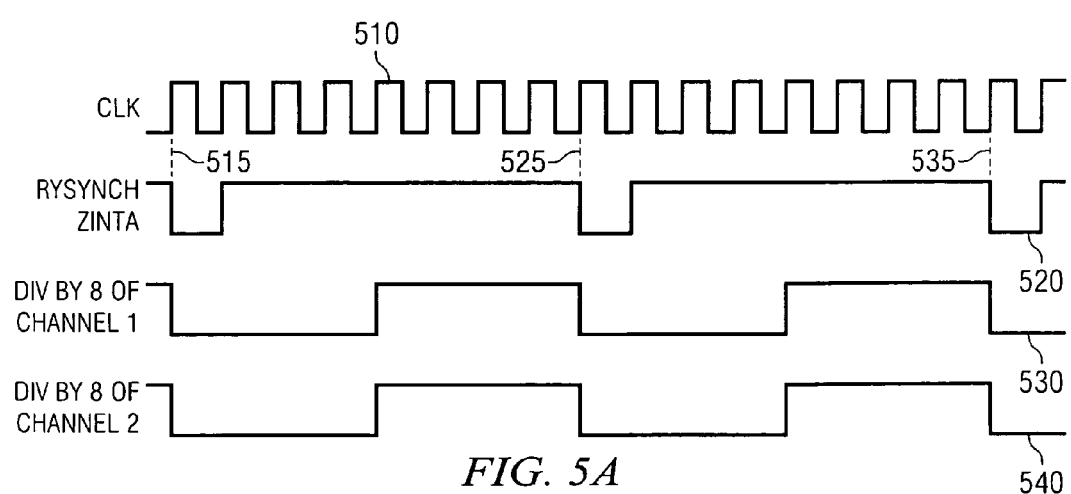
FIGS. 5A to 5C are graphs together illustrating the manner in which various clock signals are synchronized according to an aspect of the present invention.
Figure 5B:
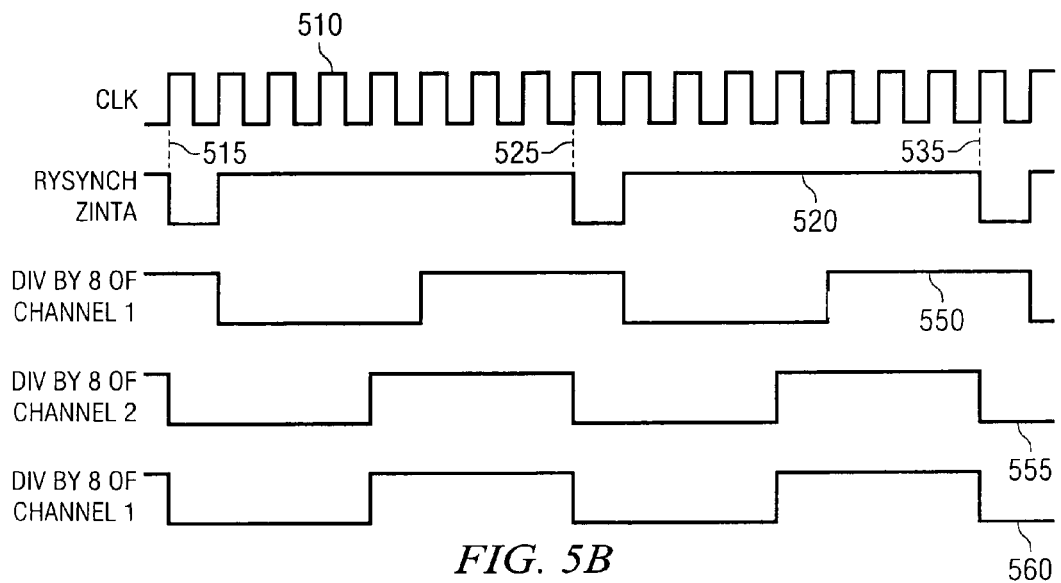
Figure 5C:
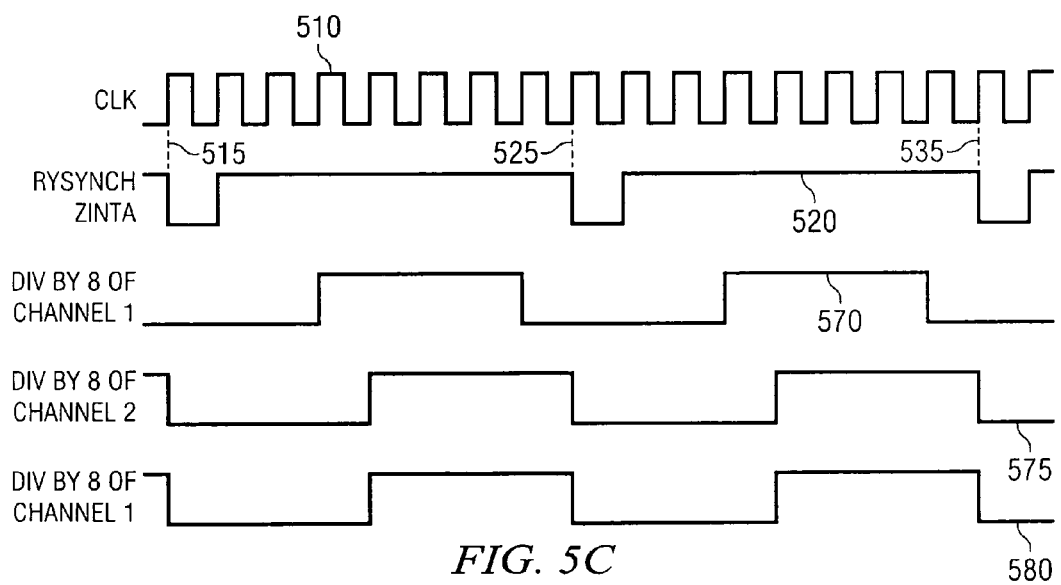

FIGS. 5A, 5B and 5C are graphs together illustrating the details of changes in divby8 signal of channel1 (e.g., 157-1) and channel2 (e.g., 157-2) responsive to resynchzinta signal. FIGS. 5A to 5C illustrate only the divby8 signal of channel1 and channel2, however, all the remaining channels may operate in similar manner.

FIG. 5A is a graph illustrating the details of change in divby8 signal of channel1 and channel2 when channel1 and channel2 are in sync (normal operation). Lines 510, 520, 530 and 540 represent CLK, resynchzinta, divby8 of channel1 and divby8 of channel2 signals respectively. The CLK signal changes periodically with respect to time as illustrated by line 510. Line 520 representing the resynchzinta signal, which is generated by sync generator 350 to synchronize the data channels that are out of sync.

The resynchzinta signal is generated for a short interval, which goes low once in every $8^{th}$ cycle of the CLK signal as represented by time points 5.15, 525 and 535 and remains low for one cycle of CLK signal. In normal operation of receiver 170, the divby8 signal of channels 1 and 2 transitions from a logic high to low once in every $8^{th}$ cycle of CLK signal as represented by time points 515, 525 and 535, and accordingly no re-synchronization is required.

FIG. 5B is a graph illustrating the details of change in divby8 signal of channel1 and channel2 with reference to CLK signal when channel1 goes out of sync (i.e., the divby8 transition occurs after the resynchzinta pulse). Lines 550 and 555 respectively illustrate the divby8 signal of channel1 and channel2 before synchronisation. It can be observed that line 550 is not making a transition from logic high to low at time point 515 (corresponding to the falling edge of divby8 clock), reflecting an out-of-sync status.

Now, assuming that the resynchzinta signal is applied and goes low at time point 515, sync counter 470 is forced to switch to state A and thus causing divby8 signal of channel1 to go low immediately in the same cycle of CLK signal 301 as illustrated by line 560. Line 555 of channel2, which is already in sync, may not change from its normal operation. Thus, channel1, which is out of sync, may be re-synchronized with the resynchzinta signal.

FIG. 5C is a graph illustrating the manner in which divby8 signal is re-synchronized even in situations when the divby8 transition occurs before the resynchzinta pulse. As may be observed from line 570, the divby8 transitions can continue to occur before the resynchzinta, thereby requiring re-synchronization. The resynchzinta pulse at timepoint 515 causes the divby8 signal of channel1 to make a transition exactly at every $8^{th}$ cycle of CLK signal as represented by line 580. Line 575 of channel2, which is already in sync, may not change from its normal operation.

Thus, channel1, which is out of sync, may be re-synchronized with the resynchzinta signal. The manner in which the sync signal (resynchzinta) is generated is described below with reference to FIG. 6.

7. Sync Generator

Figure 6:
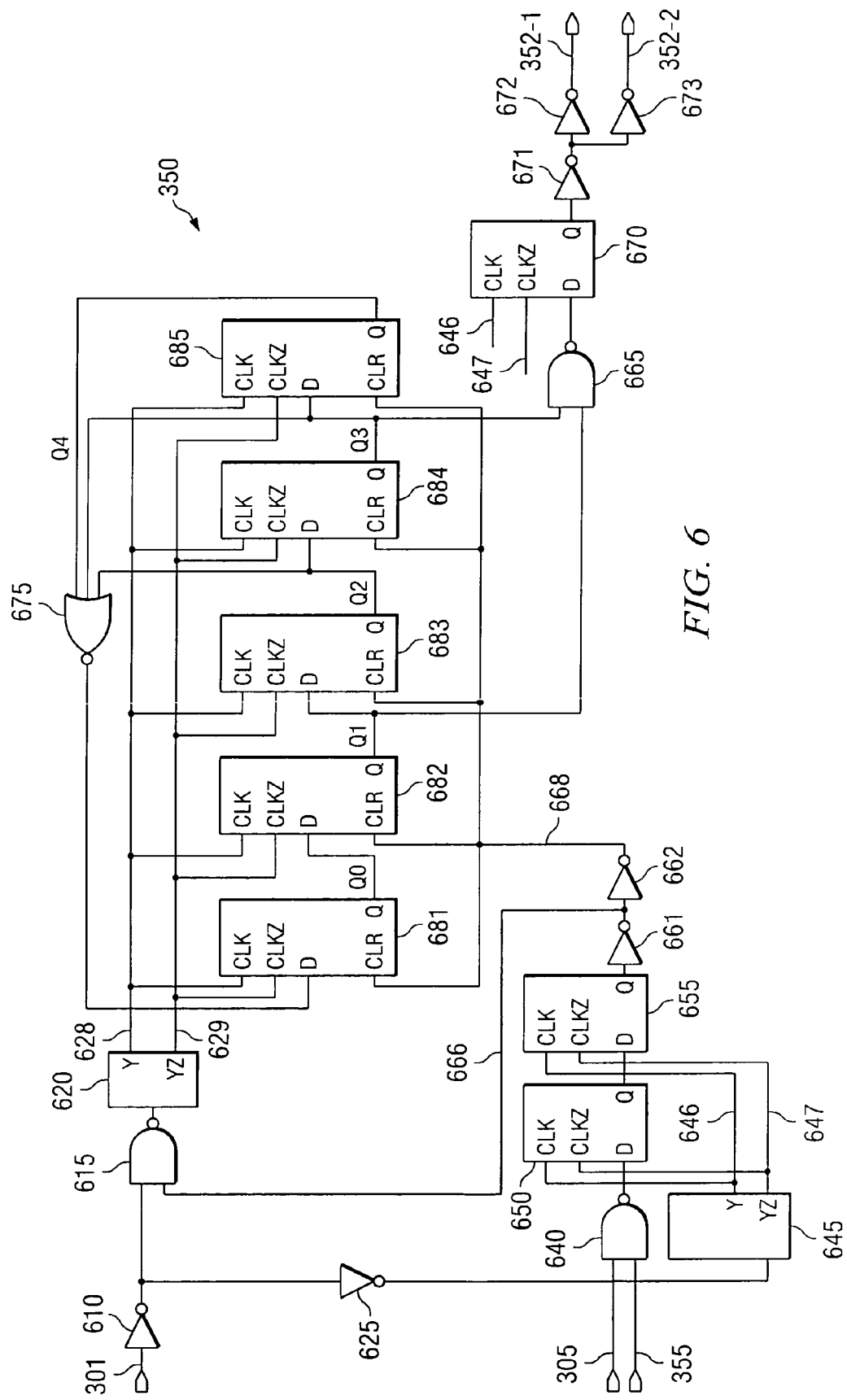
FIG. 6 is a circuit diagram illustrating the details of a sync generator in an embodiment of the present invention.

FIG. 6 is a circuit diagram illustrating the details of sync generator (sync8) 350 in an embodiment of the present invention. Sync generator 350 receives CLK 301, sync-enable 355 and RESETZ 305 signals and may generate RESYNCHZINTA 352-1 and RESYNCHZINTB 352-2 signals. RESYNCHZINTA 352-1 and RESYNCHZINTB 352-2 (resync signals) signals are periodic signals of short interval, which repeats for every n×M cycles, wherein 'n' represents an integer, 'x' represents multiplication, 'M' represents the number of parallel bits generated by serial to parallel converter blocks 320-1 to 320-16. In an embodiment of the present invention, 'n' and 'M' respectively equal 1 and 8.

Therefore, for illustration, sync generator 350 is implemented to repeat RESYNCHZINTA 352-1 and RESYNCHZINTB 352-2 signals for every 8 cycles. In an embodiment, RESYNCHZINTA 352-1 and RESYNCHZINTB 352-2 makes a transition from a logic high to logic low for every $8^{th}$ cycle and stays low only for one cycle of CLK signal 301. The logical value of RESYNCHZINTA 352-1 and RESYNCHZINTB 352-2 may change as . . . 0111111101111111011111110 . . . , which is also illustrated above by line 520 of FIG. 5A. However, alternative embodiments may be implemented with several variations without departing from the scope and spirit of the present invention, as will be apparent to one skilled in the relevant arts based on the disclosure provided herein.

Sync generator 350 is shown containing inverters 610, 625, 661, 662, 671, 672 and 673, NAND gates 615, 640 and 665, NOR gate 675, complementary signal generators 620 and 645, and flip-flops 650, 655, 670 and 681, 682, 683, 684 and 685. Each component is described below.

Inverter 610 and NAND gate 615 operate to pass CLK signal 301 when synchronized RESETZ 666 is at a high logical level. When synchronized RESETZ 666 is low, CLK signal 301 is not passed through. Complementary signal generator 620 receives (the double inverted) CLK signal 301 and generates CLKBUF 628 and CLKBUFZ 629 signals. CLKBUF 628 and CLKBUFZ 629 are complement to each other, but with transitions occurring at the same time points (i.e., out of phase by 180 degrees).

Inverters 625 and 661, NAND gate 640, complementary signal generator 645, and flip-flops 650 and 655 operate to generate synchronized RESETZ 666, which represents RESETZ signal 305 synchronized with CLK signal 301 to avoid meta-stability. To achieve such a result, inverter 625 inverts the inverted CLK signal (generated by inverter 610) and provides the delayed CLK signal to complementary signal generator 645. Complementary signal generator 645 generates the complementary clock signals inclk 646 and inclkz 647, which are respectively connected to clk and clkz inputs of flip-flops 650 and 655.

NAND gate 640 inverts RESETZ 305 and provides the resulting RESET signal to D-input of flip-flop 650 when sync-enable 355 is high. Flip-flop 650 receives the inverted RESETZ from NAND gate 640 and clock signals (inclk 646 and inclkz 647) derived from CLK and provides the inverted and synchronized RESETZ signal to flip-flop 655. Flip-flop 655 again synchronizes the inverted RESETZ signal with the clock signals (inclk 646 and inclkz 647) and provides the synchronized RESETZ signal to inverter 661.

Inverter 661 inverts the inverted and synchronized RESETZ signal and generates the synchronized RESETZ signal 666. Inverter 662 further inverts the synchronized RESETZ signal 666 and provides the resulting RESET signal on path 668, which is connected to clr input of flip-flops 681, 682, 683, 684 and 685.

Flip-flops 681, 682, 683, 684 and 685, and NOR gate 675 form a modified Johnson counter, which repeats eight states for every eight consecutive cycles of CLK signal 301. Flip-flops 681, 682, 683, 684 and 685 contain inputs clk, clkz, D, clr and output Q. The inputs clk, clkz and clr of each flip-flop are respectively connected to CLKBUF 628, CLKBUFZ 629 and RESETZ signal on path 668.

The Q-outputs of flip-flops 681, 682, 683, 684 and 685 are respectively denoted by Q0, Q1, Q2, Q3, and Q4. The Q-output of each flip-flop is connected to D-input of the next flip-flop except the D-input of flip-flop F1. For example. Q0 is connected to D-input of flip-flop 682, Q1 is connected to D-input of flip-flop 683, etc. The D-input of flip-flop F1 is connected to NOR gate 675.

NOR gate 675 receives Q2. Q3 and Q4 and may provide the logical NOR of Q2, Q3 and Q4 to D-input of flip-flop 681. NAND gate 665 receives Q1 and Q3 and provides the output to D-input of flip-flop 670. NAND gate 665 may decode one of the eight states of the modified Johnson counter. The eight states are described below with reference to FIG. 7.

Figures 7, 8, 10:
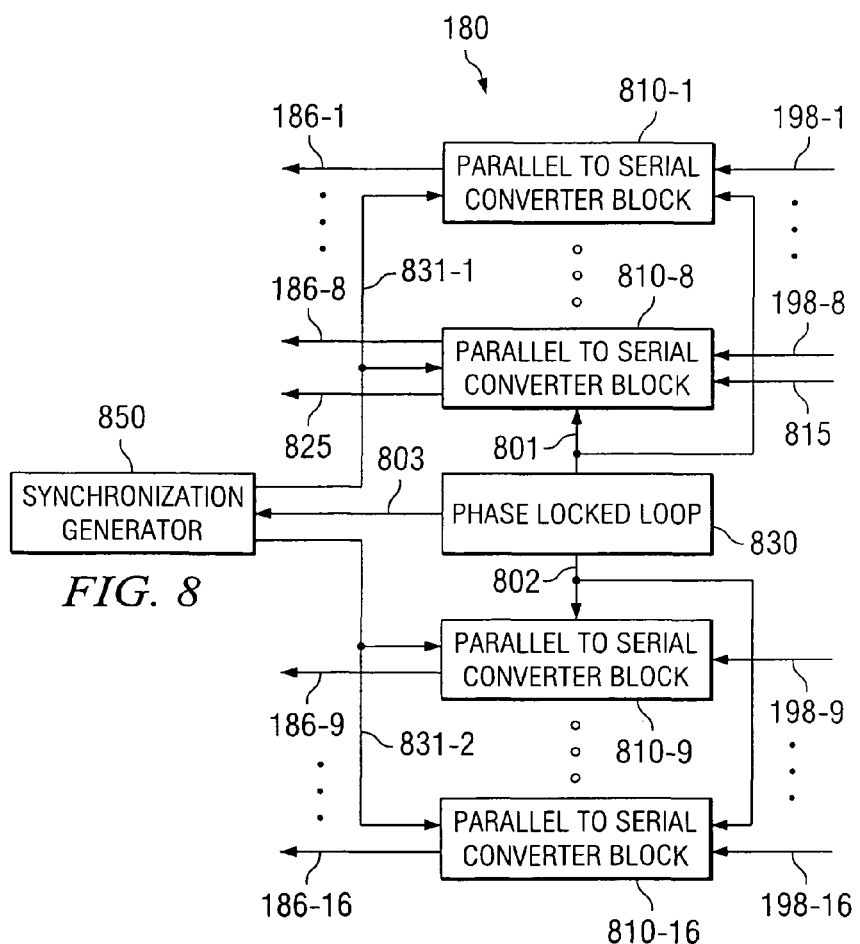
FIG. 7 depicts a table illustrating the details of eight states reached by a sync generator in an embodiment of the present invention.
FIG. 8 is a block diagram illustrating the details of a transmitter in an embodiment of the present invention.
FIG. 10 depicts a table illustrating the details of eight states reached by a sync counter in a parallel to serial converter.

When RESETZ 305 or sync-enable 355 is low, flip-flops 681, 682, 683, 684 and 685 are cleared and hence the output 'Q0 Q1 Q2 Q3 Q4' may be '0 0 0 0 0', which is represented by state 1 in FIG. 7. When RESETZ 305 is high, the modified Johnson counter starts counting and thus the output is represented by other seven states (states 2, 3, 4, 5, 6, 7 and 8). The eight states are repeated for every eight clock cycles.

NAND gate 665 may decode the outputs Q1 and Q3 to generate resynchzinta 352-1 and resynchzintb 352-2, which may go low for every eight cycles. The output of NAND gate 665 is low only for state 5 and is high for all other states. Thus, the output of NAND gate 665, which may represent resynchzinta 352-1 and resynchzintb 352-2 signals, transitions from high to low for every eight cycles and remains low only for one cycle (in the steady state).

Flip-flop 670 synchronizes the output of NAND gate 665 to INCLK 646 (and INCLKZ 647). Inverter 671 inverts the Q-output of flip-flop 670, and inverters 672 and 673 further inverts the output of inverter 671. The outputs of inverters 672 and 673 are respectively provided as resynchzinta 352-1 and resynchzintb 352-2. As may be appreciated, resynchzinta 352-1 and resynchzintb 352-2 are identical, and provided on two different paths to drive multiple serial to parallel converter blocks.

The synchronization signals thus generated are used to synchronize the various data channels in receiver 170 as described above. As also described above, the data of some of the channels is generated by transmitter 150, which can be implemented similar to transmitter 180. The manner in which transmitter 180 is implemented in an embodiment according to the present invention is described below with reference to FIG. 8.

8. Transmitter

FIG. 8 is a block diagram illustrating the details of transmitter 180 in an embodiment of the present invention. Transmitter 180 is shown containing parallel to serial converter blocks 810-1 through 810-16, phase locked loop (PLL) 830 and sync generator (SYNC8) 850. Each component is described in detail below.

For illustration, transmitter 180 is shown containing 16 independent data channels 198-1 through 198-16 (all contained in path 198 of FIG. 1) and common byte clock 815. While the embodiments are described with reference to 16 channels for illustration, alternative embodiments can be implemented with a different number of channels without departing from the scope and spirit of various aspects of the present invention, as will be apparent to one skilled in the relevant arts by reading the disclosure provided herein.

PLL 830 may generate clock signals 801, 802 and 803, which are respectively provided to parallel to serial converter blocks 810-1 through 810-8, 810-9 through 810-16, and sync generator 850. The three clock signals are identical but may be generated as such merely to distribute the capacitive load on PLL 830. PLL 830 may be implemented in a known way.

Common byte clock 815 represents a reference clock signal using which data is received on channels 198-1 through 198-16. A byte of data may be received on each rising edge of common byte clock 815, and thus all the receive channels are synchronized to common byte clock 815. Byte clock signal 815 may be generated by dividing clock signal 801 by eight.

Each of parallel to serial converter blocks 810-1 through 810-16 may generate byte clock signals (not shown) to provide time reference to receive the corresponding parallel data. However, the byte clock signals may be synchronized to a common time reference using the resync signals. As a result, one of the byte clock signals may be used as a common clock associated with all 16 parallel data channels 198-1 through 198-16. Thus, common byte clock 815 may be generated by one of the parallel to serial converter blocks 810-1 through 810-16, but used by all the blocks to receive the corresponding data bytes. Similarly, clkout 825 may also be venerated by one of the blocks, but used by all other blocks while transmitting the data on the respective serial communication channels.

Sync generator 850 may generate resynchzinta 831-1 and resynchzintb 831-2, which are similar to resynchzinta 352-1 and resynchzintb 352-2. Sync generator 850 may be implemented similar to sync generator 350, which is described above.

Each of the parallel to serial converter blocks 810-1 through 810-16 converts the respective low speed parallel data into a high speed serial data, and provides the converted data as a serial communication channel on the respective path 186-1 through 186-16. The high speed serial data of all 16 channels on paths 186-1 through 186-16 may be provided using clkout 825 as a common clock signal.

Parallel to serial converter blocks 810-1 through 810-8 also receive resynchzinta 831-1 and blocks 810-9 through 810-16 receive resynchzintb 831-2. The resynchzinta and resynchzintb signals are used to synchronize the blocks that are out of sync. Example embodiments of parallel to serial converter blocks 810-1 through 810-16 are described below with reference to FIGS. 9A-9C.

9. Parallel to Serial Converter

Figure 9C:
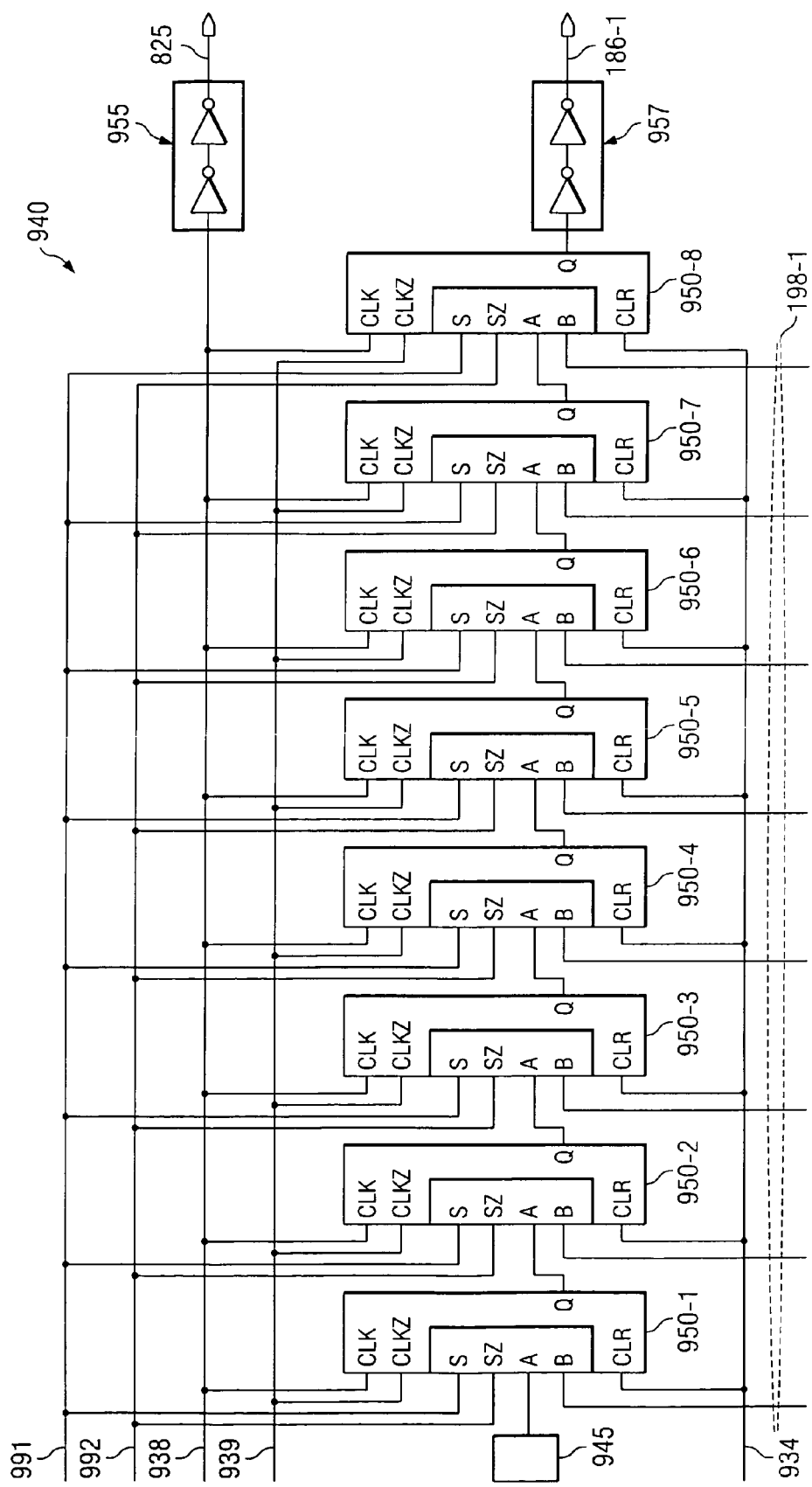
FIG. 9 is a circuit diagram illustrating the details of an embodiment of a parallel to serial converter used in a transmitter.
Figure 10:
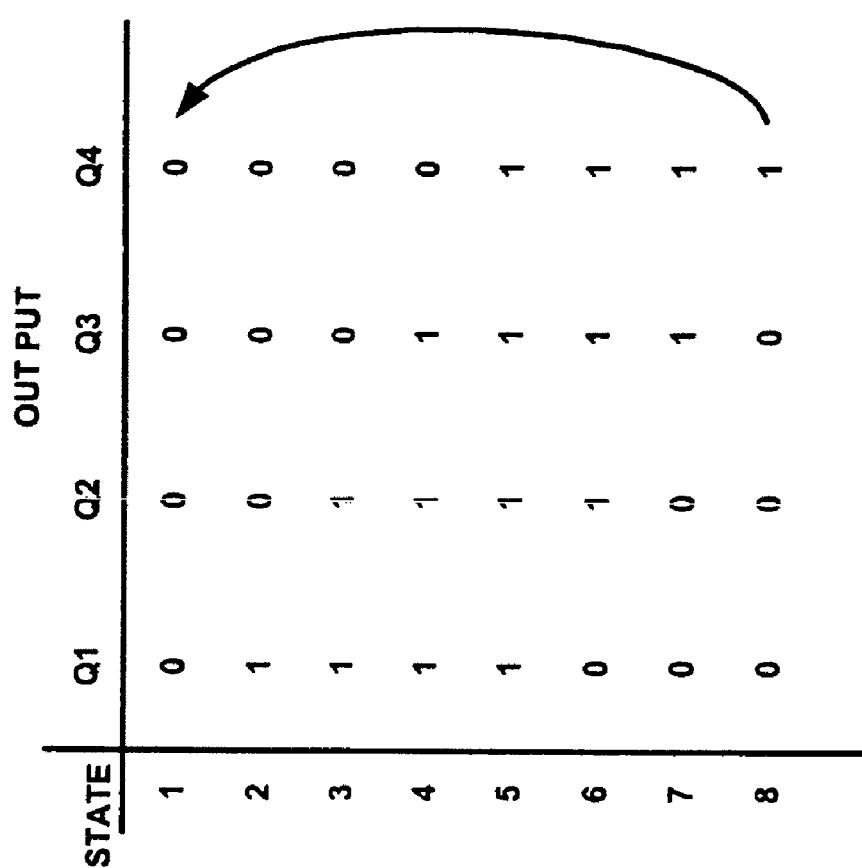

FIGS. 9A, 9B and 9C together represent a circuit diagram illustrating the details of parallel to serial converter 810-1 in an embodiment of the present invention. However, the remaining parallel to serial converter blocks 810-2 through 810-16 may also be implemented in a similar manner. Parallel to serial converter 810-1 is shown containing signaling circuit 910, shift register 940 and sync counter 980. Each component is described below.

Continuing with exclusive reference to FIG. 9A, signaling circuit 910 is shown containing inverters 905, 907, 915, 930 and 932, NAND gate 935, complementary signal generators 912 and 937, and flip-flops 920 and 925. The components operate to generate CLKIN 938, CLKINZ 939 and CLR 934. The components and output signals are described below in further detail.

Inverter 905 and NAND gate 935 operate to pass CLK signal 801 when INT-RESETZ 931 is at a high logical level (i.e., when no reset is requested). When INT-RESETZ 931 is low, CLK signal 801 is not passed through. Complementary signal generator 937 receives (the double inverted) CLK signal 801 and generates CLKIN 938 and CLKINZ 939 signals. CLKIN 938 and CLKINZ 939 signals are complement to each other, but with transitions occurring at the same time points (i.e., 180 degrees out-of-phase).

Inverters 907, 915, and 930, complementary signal generator 912, and flip-flops 920 and 925 operate to generate INT-RESETZ 931, which represents RESETZ signal 902 synchronized with CLK signal 801 to avoid meta-stability. To achieve such a result, inverter 907 inverts the inverted CLK signal and provides the delayed CLK signal to complementary signal generator 912. Complementary signal generator 912 generates the complementary clock signals CLKI 913 and CLKIZ 914, which are respectively connected to clk and clkz inputs of flip-flops 920 and 925.

Flip-flop 920 receives the inverted RESETZ signal from inverter 915 and clock signals (CLKI and CLKIZ) derived from CLK 801 and provides the inverted and synchronized RESETZ signal to flip-flop 925. Flip-flop 925 again synchronizes the inverted RESETZ signal with the clock signals and provides the resulting clock signal to inverter 930.

Inverter 930 inverts the inverted and synchronized RESETZ signal and provides the synchronized RESETZ signal as INT-RESETZ 931. INT-RESETZ 931 is inverted by inverter 932 and provided as CLR signal 934. Thus, signaling circuit 910 provides CLK 801 and RESETZ 902 respectively as CLKIN 938 and CLR 934 with a desired timing relationship to shift register 940.

Continuing with reference to FIG. 9B, sync counter 980 is shown containing flip-flop 965, NAND gate 970, complementary signal generator 975, flip-flops 960-1, 960-2, 960-3 and 960-4, inverters 977, 982 and 984, and buffers 986 and 988. The components operate to generate BYTECLOCK 815, SELECT 991 and SELECTZ 992, which are all resynchronized with resynchzinta 831-1 as described below.

Flip-flop 965 synchronizes resynchzinta 831-1 to CLKI 913 and CLKIZ 914 signals, and generates the synchronized signal on the Q-output. As may be appreciated, flip-flop 965 provides a delay to satisfy setup and hold times for resynchzinta signal 831-1 when the signal arrives at the input of flip-flops 960-1 through 960-4.

NAND gate 970 generates an output of high logical value when either the output of flip-flop 965 (i.e. re-timed resynchzinta 831-1) or INT-RESETZ 931 is of a low logical value, and an output of a low logical value otherwise. The output of NAND gate 970 thus contains a logical high value when flip-flops 960-1 through 960-4 need to be reset.

Complementary signal generator 975 generates clear (CLRI) which equals the output of NAND gate 970. Complementary signal generator 975 further generates preset (PREZI) signal, which represents an inverted version of CLRI with the same time reference.

Flip-flops 960-1, 960-2, 960-3 and 960-4 contain inputs clk, clckz, D, clr and output Q. The inputs clk and clkz of all flip-flops are respectively connected to CLKI 913 and CLKIZ 914 signals. The clr input of all flip-flops is connected to CLRI signal generated by complementary signal generator 975. The output of each flip-flop is connected to D-input of the next flip-flop except the D-input of flip-flop 960-1. The D-input of flip-flop 960-1 is connected to inverted Q-output of flip-flop 960-4 through inverter 977.

Flip-flops 960-1, 960-2, 960-3 and 960-4 and inverter 977 form a Johnson counter with 8-states (shown in FIG. 10) repeating for every eight clock cycles. When resynchzinta 831-1 is low, that causes CLRI to be high, which clears Q-outputs (makes logic low) of flip-flops 960-1, 960-2, 960-3 and 960-4. The Q-output of flip-flops 960-1, 960-2, 960-3 and 960-4 are respectively represented as Q1, Q2, Q3 and Q4. The eight states shown in FIG. 10 would repeat during every successive eight clock cycles unless reset again CLRI signal.

Inverter 982 inverts the output Q1 and the inverted output is provided to both NAND gate 985 and inverter 984. The output of inverter 984 is provided as BYTECLOCK 815, which would remain in a low state for four consecutive clock cycles and in a high logical state in the subsequent four consecutive clock cycles. Thus, the BYTECLOCK is generated as a low speed clock having a frequency of one eighth the frequency of CLK signal 801.

NAND gate 985 performs a NAND operation of Q2 and inverted Q1, and provides the output to buffers 986 and 988. The output of NAND gate 980 is low only for state 6 and is high for all other states as may be appreciated by examining FIG. 10. Thus, the output of NAND gate 985 is at low logical level for only one clock cycle, and in a high logical level during the remaining 7 clock cycles.

Buffer 986 is shown containing contain three inverters connected in series, and thus inverts the output of NAND gate 985 to generate SELECT 991. Thus. SELECT signal 991 would be at a high logical level in only one of the eight clock cycles. On the other hand, buffer 988 containing only two inverters, generates SELECTZ 992 which remaining at a low logical value in only one of the eight clock cycles. The SELECT signal may be used to load the low speed parallel data on path 198-1 into shift register 940 once every cycle of BYTECLOCK 815.

The manner in which BYTECLOCK 815, SELECT 991 and SELECTZ 992 are synchronized using the resynchzinta 831-1 is described below.

It may be first appreciated that resynchzinta 831-1 signal goes low once in every $8^{th}$ clock cycle causing CLRI signal to go high. The high state in turn causes the Johnson counter of flip-flops 960-1 through 960-4 to reset to all zeroes state. Therefore, resynchzinta signal 831-1 causes the Johnson counter to be reset to all-zeroes state. Thus, the sync signal (resynchzinta) causes the out of sync channel 320-1 to be in sync without any latency.

However, resynchzinta signal 831-1 may not affect channels which are already in sync. If parallel to serial converter 810-1 is already in sync, sync counter 980 may have already reached all zeroes independently when CLRI is asserted. Thus, a channel which is already in sync operates without being affected even if resynchzinta signal 831-1 is applied.

The sync signal to all sync counters in parallel to serial converter blocks 810-1 through 810-16 may be received substantially at the same time and thus all channels which are out of sync may be synchronized at the same time and without substantial latency (one clock cycle in the above examples).

Now, continuing with reference to FIG. 9C, shift register 940 receives SELECT 991, SELECTZ 992, CLKIN 938, CLKINZ 939, CLR 934 signals and 8-bit parallel data 198-1. Shift register 940 converts the received low speed parallel data into high speed serial data, and provides the converted data bits on path 186-1 (contained in path 186 of FIG. 1).

Shift register 940 contains eight scan flip-flops 950-1 through 950-8 and each scan flip-flop may contain clk, clkz, s, sz, A, B, and clr inputs, and Q-output. The clk and clkz inputs are respectively connected to CLKIN 938 and CLKINZ 939 signals. The s and sz inputs are respectively connected to SELECT 991 and SELECTZ 992 signals and B-input of each scan flip-flop is connected to the corresponding bit of 8-bit parallel data on path 198-1. The A-input of each scan flip-flop is connected to Q-output of the previous scan flip-flop except scan flip-flop 950-11. Tie-off cell 945 provides input to A-input of scan flip-flop 950-1, and is set to a pre-determined logical value (e.g., 0).

The Q-output of flip-flop 950-8 is connected to buffer 957, which may contain two inverters connected in series. The output of buffer 957 may be provided as serial data DOUT 186-1. Buffer 955 may receive CLKIN 938, which may contain two inverters connected in series. Buffer 955 may provide the output as high speed clock, CLKOUT 825.

Each scan flip-flop generally operates as a combination of a multiplexer and a flip-flop. When SELECT signal 991 is high once every eight cycles, the scan flip-flops load the parallel data into shift register 940. Then, when SELECT signal 991 is low, shift register 940 shifts the 8-bit parallel data out on path 186-1. Thus, the parallel data on path 198-1 is converted into the serial data on path 186-1.

From the above, it may be readily appreciated that resynchzinta signal 831-1 may synchronizes SELECT 991 and BYTECLOCK 815 signals, which may be used to convert the low speed parallel data 198-1 into serial data 186-1. Thus, parallel to serial converter 820-1 may be synchronized if it is out of sync.

10. CONCLUSION

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A receiver block comprising:

a synchronization generator generating a sequence of synchronization signals with a short interval between successive ones of said sequence of synchronization signals;

a plurality of converter blocks receiving each of a plurality of sequences of serial data elements on a corresponding one of a plurality of serial data channels, said plurality of converter blocks converting each of said plurality of sequences of serial data elements to a corresponding one of a plurality of sequences of parallel data elements, said plurality of converter blocks sending each of said plurality of sequences of parallel data elements on a corresponding one of a plurality of parallel data channels, wherein each of said parallel data elements comprises a byte containing 8 bits, such that said sequence of synchronization signals are generated periodically with a period of eight times the period of said second common clock signal, and wherein each of said sequence of synchronization signals comprises a pulse; and said plurality of converter blocks receiving said sequence of synchronization signals and ensuring that said plurality of parallel data channels are synchronized with a first common clock signal in response to each of said sequence of synchronization signals such that all of said sequences of parallel data elements are sent on said plurality of parallel data channels using said first common clock signal, wherein said plurality of converter blocks receive a second common clock signal associated with said plurality of serial data channels and wherein said second common clock signal provides a common reference for said plurality of serial data channels.

2. A receiver block comprising:

a synchronization generator generating a sequence of synchronization signals with a short interval between successive ones of said sequence of synchronization signals;

a plurality of converter blocks receiving each of a plurality of sequences of serial data elements on a corresponding one of a plurality of serial data channels, said plurality of converter blocks converting each of said plurality of sequences of serial data elements to a corresponding one of a plurality of sequences of parallel data elements, said plurality of converter blocks sending each of said plurality of sequences of parallel data elements on a corresponding one of a plurality of parallel data channels;

wherein a first converter block is contained in said plurality of converter blocks, said first converter block comprising a serial shift register receiving a plurality of bits on said serial data channel, a parallel register containing a plurality of memory elements, said plurality of bits being loaded into said plurality of memory elements from said serial shift register at a time point specified in relation to said sequence of synchronization signals, said plurality of bits being loaded into said plurality of memory elements to generate a corresponding one of said parallel data elements, and a sync counter generating said first common clock signal synchronized with said sequence of synchronization signals, wherein said first common clock signal has a frequency of 1/Number, wherein Number equals a number of bits in each of said parallel data elements; and said plurality of converter blocks receiving said sequence of synchronization signals and ensuring that said plurality of parallel data channels are synchronized with a first common clock signal in response to each of said sequence of synchronization signals such that all of said sequences of parallel data elements are sent on said plurality of parallel data channels using said first common clock signal, wherein said plurality of converter blocks receive a second common clock signal associated with said plurality of serial data channels and wherein said second common clock signal provides a common reference for said plurality of serial data channels.

3. The receiver block of claim 2, wherein said first converter block comprises a signaling circuit receiving said second common clock signal and generates a complement of said second common clock signal, wherein said second common clock signal and said complement of said second common clock signal are out-of-phase by 180 degrees, wherein said serial shift register is coupled to receive said second common clock signal and said complement of said second common clock signal.

4. The receiver block of claim 3, wherein said signaling circuit comprises a buffer to delay said plurality of bits such that said plurality of bits are provided at a same time reference as said second common clock signal and said complement of said second common clock signal to said serial shift register.

5. The receiver block of claim 4, wherein said signaling circuit further comprises:

a first complementary signal generator receiving said second common clock signal, and generating a complement of said second common clock signal along with said second common clock signal, which are out-of-phase by 180 degrees;

a first flip-flop receiving said second common clock signal, complement of said second common clock signal and a reset signal, said first flip-flip synchronizing said reset signal to said second common clock signal to generate a first flip-flop output;

a first inverter inverting said first flip-flop output to generate a first inverter output;

a first NOR gate performing a logical NOR operation of said first flip-flop output and an inverted version of said second common clock signal to generate a first NOR output; and a second complementary signal generator receiving said first NOR output and generating said second common clock signal and said complement of said second common clock signal.

6. The receiver block of claim 5, wherein said sync counter comprises:

a sequence of flip-flops connected in series, wherein an inverted version of an output of one of said sequence of flip-flops is coupled as an input to a data input of a first one of said sequence of flip-flop to form a modified Johnson counter;

a second flip-flop synchronizing said sequence of synchronization signals to said second common clock signal to generate a second flip-flop output; and a second NAND gate performing a logical NAND operation of said second flip-flop output and said first inverter output to generate a second NAND output, wherein said second NAND output is used to clear some of said sequence of flip-flops of said modified Johnson counter, and a complement of said second NAND output is used to clear another one of said sequence of flip-flops, wherein an output of a last one of said sequence of flip-flops is provided as said first common clock signal.

7. The receiver block of claim 4, wherein said synchronisation generator generates said sequence of synchronization signals with a frequency of [1/Number] of a frequency of said second common clock signal, wherein Number equals a number of bits in each of said parallel data elements.

8. A device comprising:
a core logic block;
a receiver block;
a synchronization generator generating a sequence of synchronization signals with a short interval between successive ones of said sequence of synchronization signals; and
a plurality of converter blocks receiving each of a plurality of sequences of parallel data elements on a corresponding one of a plurality of parallel data channels from said core logic block, each of said plurality of converter blocks converting a corresponding one of said plurality of sequences of parallel data elements to a corresponding one of a plurality of sequences of serial data elements, said plurality of converter blocks sending each of said plurality of sequences of serial data elements on a corresponding one of a plurality of serial data channels to said receiver block, wherein said plurality of converter blocks use a second common clock signal associated with said plurality of serial data channels, wherein said plurality of serial data channels are synchronized with said second common clock signal, wherein each of said parallel data elements comprises N bits, wherein N represents an integer, wherein said short interval equals M×N of a clock period of said second common clock signal, wherein M also represents an integer and 'x' represents a multiplication operation; and
said plurality of converter blocks receiving said sequence of synchronization signals and ensuring that said plurality of parallel data channels are synchronized to a common time reference in response to each of said sequence of synchronization signals such that a first common clock signal is used to receive all of said plurality of sequences of parallel data elements on said plurality of parallel data channels.

9. The device of claim 8, wherein each of said parallel data elements comprises a byte containing 8 bits, and M equals 1, such that said sequence of synchronization signals are generated periodically with a period of eight times the period of said second common clock signal.

10. The device of claim 9, wherein each of said sequence of synchronization signals comprises a pulse.

11. A device comprising:
a core logic block;
a receiver block;
a synchronization generator generating a sequence of synchronization signals with a short interval between successive ones of said sequence of synchronization signals; and
a plurality of converter blocks receiving each of a plurality of sequences of parallel data elements on a corresponding one of a plurality of parallel data channels from said core logic block, each of said plurality of converter blocks converting a corresponding one of said plurality of sequences of parallel data elements to a corresponding one of a plurality of sequences of serial data elements, said plurality of converter blocks sending each of said plurality of sequences of serial data elements on a corresponding one of a plurality of serial data channels to said receiver block, wherein said plurality of converter blocks use a second common clock signal associated with said plurality of serial data channels, wherein said plurality of serial data channels are synchronized with said second common clock signal;
said plurality of converter blocks receiving said sequence of synchronization signals and ensuring that said plurality of parallel data channels are synchronized to a common time reference in response to each of said sequence of synchronization signals such that a first common clock signal is used to receive all of said plurality of sequences of parallel data elements on said plurality of parallel data channels, wherein a first converter block is contained in said plurality of converter blocks, said first converter block comprising a shift register converting each of said parallel data elements into a plurality of serial data elements, said shift register loading each of said parallel data elements at a time point specified in relation to a corresponding one of said sequence of synchronization signals, said shift register shifting a loaded parallel data element to generate corresponding said plurality of serial data elements, wherein said plurality of serial data elements are comprised in a corresponding sequence of serial data elements, wherein said first converter block further comprises a sync counter generating a select signal synchronized with said sequence of synchronization signals, wherein said select signal specifies said time point to load each of said parallel data elements in said shift register, and wherein said sync counter generates said first common clock signal synchronized with said sequence of synchronization signals, said first common clock signal providing a time reference to receive said plurality of sequences of parallel data elements, wherein said first common clock signal has a frequency of [1/Number] of a frequency of said second common clock signal, wherein Number equals a number of bits in each of said parallel data elements.

12. The device of claim 11, wherein said second common clock signal provides a common time reference signal for said plurality of serial data channels.

13. The device of claim 12, further comprises:
a PLL (phase lock loop) generating a PLL clock signal; and
a signaling circuit passing said PLL clock signal as said second common clock signal when a reset signal is not received.

14. The device of claim 13, wherein said signaling circuit generates said second common clock signal and a complement of said second common clock signal, which are out-of-phase by 180 degrees, wherein said shift register is coupled to receive said second common clock signal and said complement of said second common clock signal.

15. The device of claim 14, wherein said signaling circuit further synchronizes said reset signal to said PLL clock signal to generate a clear signal, wherein said clear signal causes said shift register to be cleared to all zeros state.

16. The device of claim 15, wherein said signaling circuit comprises:
a first complementary signal generator receiving said PLL clock signal, and generating a complement of said PLL clock signal along with said PLL clock signal, which are out-of-phase by 180 degrees;

a first flip-flop receiving said PLL clock signal, complement of said PLL clock signal and said reset signal, said first flip-flip synchronizing said reset signal to said PLL clock signal to generate a first flip-flop output;

an inverter inverting said first flip-flop output;

a first NAND gate performing a logical NAND operation of an inverted version of said first flip-flop output and an inverted version of said PLL clock signal to generate a first NAND output; and a second complementary signal generator receiving said first NAND output and generating said second common clock signal and said complement of said second common clock signal.

17. The device of claim 16, wherein said sync counter comprises:

a sequence of flip-flops connected in series, wherein an inverted version of an output of a last one of said sequence of flip-flops is coupled as an input to a data input of a first one of said sequence of flip-flops to form a modified Johnson counter;

a second flip-flop synchronizing said sequence of synchronization signals to said PLL clock signal to generate a second flip-flop output;

a second NAND gate performing a logical NAND operation of said second flip-flop output and said inverted version of said first flip-flop output to generate a second NAND output, wherein said second NAND output is used to clear said modified Johnson counter; and a third NAND gate performing a logical NAND operation of two of the outputs of said sequence of flip-flops to generate said select signal.

18. The device of claim 17, wherein an output of one of said sequence of flip-flops is provided as said first common clock signal.

19. The device of claim 13, wherein said synchronisation generator generates said sequence of synchronization signals with a frequency of [1/Number] of a frequency of said PLL clock signal, wherein Number equals a number of bits in each of said parallel data elements.

* * * * *